United States Patent

Kirk

[15] 3,648,774
[45] Mar. 14, 1972

[54] INCREASING THE INJECTIVITY INDEX AND PRODUCTIVITY INDEX OF WELLS

[72] Inventor: Walter B. Kirk, Robinson, Ill.
[73] Assignee: Marathon Oil Company, Findlay, Ohio
[22] Filed: Mar. 19, 1970
[21] Appl. No.: 21,202

[52] U.S. Cl. .................................166/305 R, 166/273
[51] Int. Cl. ...........................................E21b 43/22
[58] Field of Search ............166/305 R, 273, 274, 275, 252; 252/8.55 D

[56] References Cited

UNITED STATES PATENTS

| | | | |
|---|---|---|---|
| 3,460,622 | 8/1969 | Davis, Jr. | 166/273 X |
| 3,497,006 | 2/1970 | Jones et al. | 166/273 |
| 3,506,070 | 4/1970 | Jones | 166/273 |
| 3,537,523 | 11/1970 | Gogarty et al. | 166/305 R |
| 3,482,635 | 12/1969 | Pasini | 166/305 R |
| 3,554,289 | 1/1971 | Webb | 166/305 R |

Primary Examiner—Stephen J. Novosad
Attorney—Joseph C. Herring, Richard C. Willson, Jr. and Jack L. Hummel

[57] ABSTRACT

The injectivity index of injection wells and the productivity index of producing wells in fluid communication with a hydrocarbon-bearing formation is improved by injecting about 1–500 gallons of a micellar dispersion per vertical foot of hydrocarbon-bearing formation, thereafter injecting about 1–500 gallons of a mobility buffer per vertical foot of hydrocarbon-bearing formation, and injecting sufficient displacing fluid to displace the micellar dispersion to a radius of at least about 7.5 feet from the well bore, and thereafter injecting about 1–500 gallons of a solution capable of counteracting the decrease in permeability caused by the mobility reducing agent in the mobility buffer. For example, the micellar dispersion can be followed by a mobility buffer containing water and a partially hydrolyzed, high molecular weight polyacrylamide and this followed by 0.1–50 volumes of water per volume of mobility buffer and this, in turn, followed by about 1–500 gallons of a sodium hypochlorite solution per vertical foot of hydrocarbon-bearing formation. The displacing fluid and the mobility buffer can be substantially hydrocarbon in an "oil-wet" reservoir.

14 Claims, No Drawings

INCREASING THE INJECTIVITY INDEX AND PRODUCTIVITY INDEX OF WELLS

BACKGROUND OF THE INVENTION

1. Field of the Invention

This invention relates to improving the injectivity index of injection wells and to improving the productivity index of producing wells. This is accomplished by injecting a micellar solution followed by a mobility buffer and this, in turn, followed by a displacing fluid and lastly followed by a solution to increase the relative permeability to the flow of water. The micellar dispersion is comprised of hydrocarbon, surfactant, and aqueous medium. The mobility buffer can be hydrocarbon or water and contains a mobility reducing agent. The displacing fluid can be hydrocarbon or water.

2. Description of the Prior Art

U.S. Pat. No. 2,356,205 to Blair et al. teaches that the productivity of a producing well can be increased by removing wax-associated occlusions within the immediate vicinity of the well bore. This is accomplished by contacting the strata with a micellar solution, permitting the well to backflow to remove the objectionable components up-hole.

U.S. Pat No. 3,467,188 to Gogarty teaches the use of oil-external micellar dispersions to improve the injectivity index of injection wells. Gogarty teaches that the mobility of the micellar dispersion can be about equal to or less than the mobility of fluids in the reservoir ahead of the dispersion. Water is injected after the micellar dispersion to displace it out into the reservoir.

U.S. Pat. No. 3,467,194 to Kinney and Jones teaches the stimulation of producing wells using water-external micellar dispersions.

U.S. Pat. No. 3,470,958 to Kinney teaches stimulation of production wells by injecting an oil-external micellar dispersion and this followed by hydrocarbon to displace the micellar dispersion out into the reservoir. The hydrocarbon is preferably crude oil characteristic of the formation.

U.S. Pat. No. 3,474,865 to Gogarty and Jones teaches stimulation of injection wells using water-external micellar dispersions.

Applicant has discovered a novel method of increasing the injectivity index of injection wells as well as the productivity index of producing wells. This is an improvement over the stimulation technology taught above.

SUMMARY OF THE INVENTION

The injectivity index and productivity index are increased by a. injecting into the hydrocarbon-bearing formation about 1–500 gallons of micellar dispersion per vertical foot of the formation, followed by b. injecting about 1–500 gallons of a mobility buffer per vertical foot of the formation, and this followed by c. injecting a displacing fluid to substantially displace the micellar dispersion to a radius of at least about 7.5 feet from the well bore, and thereafter d. injecting a fluid to increase the reduced permeability caused by the mobility buffer.

The mobility buffer can be an aqueous solution containing a partially hydrolyzed, high molecular weight polyacrylamide. The displacing fluid can be water and the fluid following the displacement fluid can be an aqueous solution containing about 0.1–30% of sodium hypochlorite—the sodium hypochlorite increases the relative permeability of the formation that was adversely affected by the polyacrylamide.

DESCRIPTION OF PREFERRED EMBODIMENTS OF INVENTION

The micellar dispersion useful with this invention includes both oil-external and water-external. The micellar dispersion is comprised of hydrocarbon, aqueous medium, surfactant and optionally cosurfactant and/or electrolyte. Examples of volume amounts include from about 1% to about 80% or more of hydrocarbon, about 10% to about 95% water, at least about 4% surfactant, about 0.01% to about 20% or more of cosurfactant, and about 0.001% to about 5% by weight of electrolyte. Examples of useful micellar dispersions include those defined in U.S. Pat. Nos. 3,254,714 and 3,275,075 to Gogarty et al.; U.S. Pat. No. 3,307,628 to Sena; U.S. Pat. No. 3,330,343 to Tosch et al.; U.S. Pat. No. 3,497,006 to Jones et al., and Ser. Nos. 693,099 and 693,125, filed Dec. 26, 1967 by Jones. The hydrocarbon, aqueous medium, surfactant, cosurfactant (also identified as semipolar organic compound and cosolubilizer) and electrolyte useful with this invention include these components identified within the above-identified patents and patent applications.

In general, the surfactant can be cationic, nonionic, and anionic. The hydrocarbon can be crude oil, partially refined fractions of crude oil, refined fractions of crude oil, synthesized hydrocarbon, unreacted hydrocarbon within the surfactant, etc. The aqueous medium can be soft water, brackish water or a brine water. If the water contains ions, it is preferred that the ions are compatible with the subterranean formation, including fluids and reservoir rock. The cosurfactant can be an alcohol, ester, aldehyde, amine, amino compound ketone, ether, or combination of these functional groups within the same molecule or a like material containing about one to about 20 carbon atoms. Alcohols are preferred—examples include isopropanol, amyl alcohols, 1- and 2-hexanol, and alcohols such as 2-butoxyethanol. The electrolyte can be an inorganic or organic electrolyte and is preferably one that is compatible with the ions within the subterranean formation.

The mobility buffer can be substantially aqueous or substantially hydrocarbon. It contains a mobility reducing agent which effectively reduces the permeability to the flow of fluids, e.g., water or hydrocarbon. The purpose of the mobility buffer is to "buffer" or protect the micellar dispersion from invasion by a subsequent drive fluid. By this manner, better mobility control can be effected in the immediate vicinity of the well bore and a more efficient and uniform displacement of the micellar dispersion out to a radius of at least about 7.5 feet can be effected. Examples of useful mobility reducing agents include polysaccharides, glycerides, high molecular weight alcohols, high molecular weight organic molecules having hydrophilic groups attached to the molecule and optionally containing other groups on the molecule. A particularly useful mobility reducing agent is a partially hydrolyzed high molecular weight polyacrylamide, e.g., the "Pusher" products marketed by Dow Chemical Company. However, any chemical is useful with the mobility buffer as long as it is compatible with hydrocarbon and/or water and effectively reduces the mobility of the mobility buffer flowing within the subterranean formation.

The mobility buffer is followed by a displacing fluid which can be substantially hydrocarbon or substantially aqueous. Where the subterranean formation is an "oil-wet" system, it is preferred that the mobility buffer be substantially hydrocarbon and that the displacing fluid be substantially hydrocarbon. However, where the reservoir is a "water-wet" system or the well is an injection well, it is preferred that the mobility buffer be substantially aqueous and that the displacing fluid be an aqueous drive fluid. Examples of useful aqueous drive fluids include water containing ions characteristic of the subterranean formation or the aqueous medium can be a soft water, a brine water, or a brackish water.

The displacing fluid is followed by a fluid to increase the relative permeability to the flow of fluids characteristic of the subterranean formation. The permeability of the subterranean formation is generally adversely affected by the mobility reducing agents. For example, a partially hydrolyzed, high molecular weight polyacrylamide tends to decrease the relative permeability to the flow of water. However, an aqueous solution containing sodium hypochlorite or a like material is useful to increase the relative permeability to the flow of water flowing behind the polyacrylamide. Thus, the adverse or diminished permeability caused by the polyacrylamide is overcome by injecting the sodium hypochlorite solution. Examples of useful concentrations include about 0.1% to about 30% of the sodium hypochlorite in the aqueous medium. More preferably from about 1% to about 3% is useful. Other examples of useful agents to increase the relative permeability to the flow of fluids include any oxidizing agent that is compatible with the formation and the particular medium the agent is dissolved in. For example, sodium hydroxide, potassium hydroxide, and like materials are useful with the invention.

Regarding the volume amounts useful with the invention, about 1 to about 500 gallons and preferably about 5 to about 250 gallons and more preferably about 25 to about 200 gallons of micellar dispersion per vertical foot of hydrocarbon-bearing formation are useful.

The mobility buffer can be injected in amounts of about 1 to about 500 gallons, preferably 5 to about 250 gallons of the mobility buffer per vertical foot of formation. The preferred mobility buffer is an aqueous solution containing partially hydrolyzed, high molecular weight polyacrylamides—this is preferred where the formation is a "water-wet" system or the well is an injection well. Preferably, the mobility buffer has a mobility that is greater than the micellar dispersion injected into the formation, it can be greater than the mobility of formation fluids flowing in the formation. Also, it can be about equal to or about less than the mobility of the back portion of the micellar dispersion. More preferably, the mobility of the mobility buffer is equal to the square root of the mobility of the micellar dispersion times the mobility of the displacing fluid that displaces the mobility buffer.

The displacing fluid can be in volumes of about 1 to about 500 or more gallons per vertical foot of the hydrocarbon-bearing formation. Preferably, sufficient amounts of displacing fluid are injected to displace the micellar dispersion out to a distance of at least about 7.5 feet and more preferably about 12-15 feet in radius from the well bore. Most preferably, sufficient displacing fluid is injected to displace the mobility buffer to a radius of at least about 7.5 feet and more preferably to a radius of about 15 feet from the well bore.

About 1-500 gallons and more preferably about 10-200 gallons of the fluid containing the agent to increase the relative permeability to the flow of fluids is injected per vertical foot of hydrocarbon-bearing formation. It is preferred that sufficient fluid be injected to contact substantially all of the reservoir in a radius of at least about 7.5 feet and more preferably about 15 feet from the well bore. This is desired so that the oxidizing agent can effectively contact and overcome the adverse permeability caused by the mobility reducing agent. For example, about equal amounts of this fluid can be injected based on the volume of the mobility buffer fluid.

It is not intended that this invention be limited by the specifics taught herein. Rather, all equivalents obvious to those skilled in the art are intended to be incorporated within the scope of the invention as taught within the specification and appended claims.

What is claimed is:

1. A process of increasing the injectivity index of injection wells and the productivity index of producing wells in fluid communication with a hydrocarbon-bearing formation, the process comprising injecting into the hydrocarbon bearing formation in fluid communication with the particular well:
   1. about 1-500 gallons of a micellar dispersion per vertical foot of the hydrocarbon-bearing formation, thereafter,
   2. injecting a mobility buffer slug, and then,
   3. injecting sufficient displacing fluid to substantially displace the mobility buffer to a distance of at least about 7.5 feet in radius from the well bore, and then,
   4. injecting sufficient amounts of a fluid different from the displacing fluid of step 3 and which will act on the formation to substantially increase the relative permeability to the flow of fluids through the reservoir wherein a decreased permeability was caused by a mobility reducing agent within the mobility buffer.

2. The process of claim 1 wherein the micellar dispersion is comprised of hydrocarbon, surfactant, and aqueous medium.

3. The process of claim 2 wherein the micellar dispersion optionally contains cosurfactant and/or electrolyte.

4. The process of claim 1 wherein the mobility buffer is an aqueous solution comprised of a partially hydrolyzed, high molecular weight polyacrylamide.

5. The process of claim 1 wherein from about 1 to about 500 gallons of a mobility buffer per vertical foot of hydrocarbon-bearing formation is injected into the formation.

6. The process of claim 1 wherein from about 0.1 to about 50 volumes of water per volume of the mobility buffer is injected into the reservoir.

7. The process of claim 1 wherein said fluid of step 4 comprises about 5 to about 250 gallons of a sodium hypochlorite solution per vertical foot of hydrocarbon-bearing reservoir.

8. A process of increasing the injectivity index of an injection well in fluid communication with a hydrocarbon-bearing formation, the process comprising:
   1. injecting into the formation about 1 to about 500 gallons of a micellar dispersion per vertical foot of the formation,
   2. injecting into the formation about 1-500 gallons of a mobility buffer per vertical foot of the formation,
   3. injecting sufficient water into the formation to substantially displace the micellar dispersion to a radius of at least about 7.5 feet from the well bore,
   4. injecting about 1 to about 500 gallons of an aqueous solution containing sodium hypochlorite, and,
   5. thereafter continuing the injection of water into the injection well.

9. The process of claim 8 wherein from about 5 to about 250 gallons of the mobility buffer per vertical foot of the formation is injected.

10. The process of claim 8 wherein the mobility buffer contains a mobility reducing agent which is a partially hydrolyzed, high molecular weight polyacrylamide.

11. The process of claim 8 wherein sufficient water is injected to substantially displace the mobility buffer to a distance of at least about 7.5 feet in radius from the well bore.

12. The process of claim 8 wherein from about 0.5 to about 30 volumes of water per volume of mobility buffer is injected into the reservoir.

13. The process of claim 8 wherein from about 10 to about 200 gallons of the sodium hypochlorite solution per vertical foot of hydrocarbon-bearing formation is injected into the formation.

14. The process of claim 8 wherein the sodium hypochlorite solution contains from about 0.1 to about 30 percent of sodium hypochlorite.

* * * * *